United States Patent [19]

Yim

[11] Patent Number: 4,482,169

[45] Date of Patent: Nov. 13, 1984

[54] TRACTION RACK FOR LIGHT TRUCKS

[76] Inventor: George Yim, 950 16th St., Ogden, Utah 84404

[21] Appl. No.: 461,428

[22] Filed: Jan. 27, 1983

[51] Int. Cl.³ ............................................. B60S 9/00
[52] U.S. Cl. .................................... 280/759; 280/762
[58] Field of Search ............... 280/759, 757, 758, 762, 280/755; 410/143–149, 151; 105/73; 108/51.1, 901; 40/591, 593, 592, 590; 248/274, 364; 414/719, 673; 212/195

[56] References Cited

U.S. PATENT DOCUMENTS

| 1,438,664 | 12/1922 | Rogers | 296/182 |
|---|---|---|---|
| 1,540,914 | 6/1925 | Wallace | 296/182 |
| 2,825,600 | 3/1958 | Macomber | 296/24 |
| 2,854,247 | 9/1958 | Doxtator | 280/759 |
| 3,918,592 | 11/1975 | Paul | 280/762 |
| 4,128,270 | 12/1978 | Legueu | 296/28 R |
| 4,190,281 | 2/1980 | Chandler | 280/759 |
| 4,269,443 | 5/1981 | Farmer | 296/1 S |
| 4,339,142 | 7/1982 | Tanner | 280/759 |
| 4,343,578 | 10/1982 | Barnes | 410/143 |

Primary Examiner—Joseph F. Peters, Jr.
Assistant Examiner—Joseph G. McCarthy
Attorney, Agent, or Firm—Donald J. Singer; Bobby D. Scearce

[57] ABSTRACT

A traction rack for a rear axle driven truck is provided which comprises a generally rectangularly-shaped assembly having side elements sized for placement on the bed of the truck between the wheel wells, lead weights attached to respective ends of the side elements to form the rectangular assembly having substantial weight concentrated near the ends of the assembly near the wheel wells, one of the side elements having an extension on each end exceeding the spacing between the wheel wells to facilitate placement and restraint of the rack over the rear axle.

2 Claims, 2 Drawing Figures

TRACTION RACK FOR LIGHT TRUCKS

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of automotive accessories of the type configured for increasing traction of vehicles in snow or ice conditions, and more specifically to a device configured for placement onto the bed of a truck to increase rear wheel traction by adding weight to the truck bed at critical points over the rear axle.

In the operation of light trucks, such as half-ton pickup trucks, the weight distribution on the axles is such that these trucks are particularly susceptible to stalling and becoming stuck in heavy snow and to spinning out on icy roads at most any speed. The tendency for light trucks to get stuck and/or spin out is particularly pronounced when the truck is operated with little or no load thereon. The lack of traction in snow or ice conditions usually results in substantial waste of fuel and, in the event the truck requires towing, a substantial waste in manpower and vehicle operating expense. The lack of traction may also be a primary cause of accidents, with attendant loss in the form of personal injury and property damage. The foregoing problems are, of course, multiplied in situations where a fleet of trucks is operated.

It is well known that increasing the weight on the rear axle of a rear axle driven vehicle, such as by adding sand bags or the like, will increase traction of the rear wheels. It is, however, important to note that the location and distribution of weight added to the rear axle may be as important a consideration as that of merely adding substantial weight to the axle. The present invention provides an accessory configured to add weight with optimum distribution to the rear axle of a rear axle driven vehicle, particularly a vehicle carrying an open bed over its rear axle, such as a pickup truck, and comprises a frame sized for placement on the truck bed between the wheel wells and carrying a plurality of removable weights attached to the rack at the ends thereof as near as practicable the wheel wells to maximize the added load at points above the rear axle near each rear wheel.

It is therefore, a principal object of this invention to provide an accessory for placement on the bed of a pickup truck for increasing the traction of the rear wheels.

It is a further object of this invention to provide a traction rack for adding weight in a desired distribution to the rear axle of a pickup truck and which may be easily placed on and removed from the bed of the pickup truck.

These and other objects of the present invention will become apparent as the detailed description of certain representative embodiments thereof proceeds.

SUMMARY OF THE INVENTION

In accordance with the foregoing principles and objects of the present invention, a traction rack for a rear axle driven truck is provided which comprises a generally rectangularly-shaped assembly having side elements sized for placement on the bed of the truck between the wheel wells, lead weights attached to respective ends of the side elements to form the rectangular assembly having substantial weight concentrated near the ends of the assembly near the wheel wells, one of the side elements having an extension on each end exceeding the spacing between the wheel wells to facilitate placement and restraint of the rack over the rear axle.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
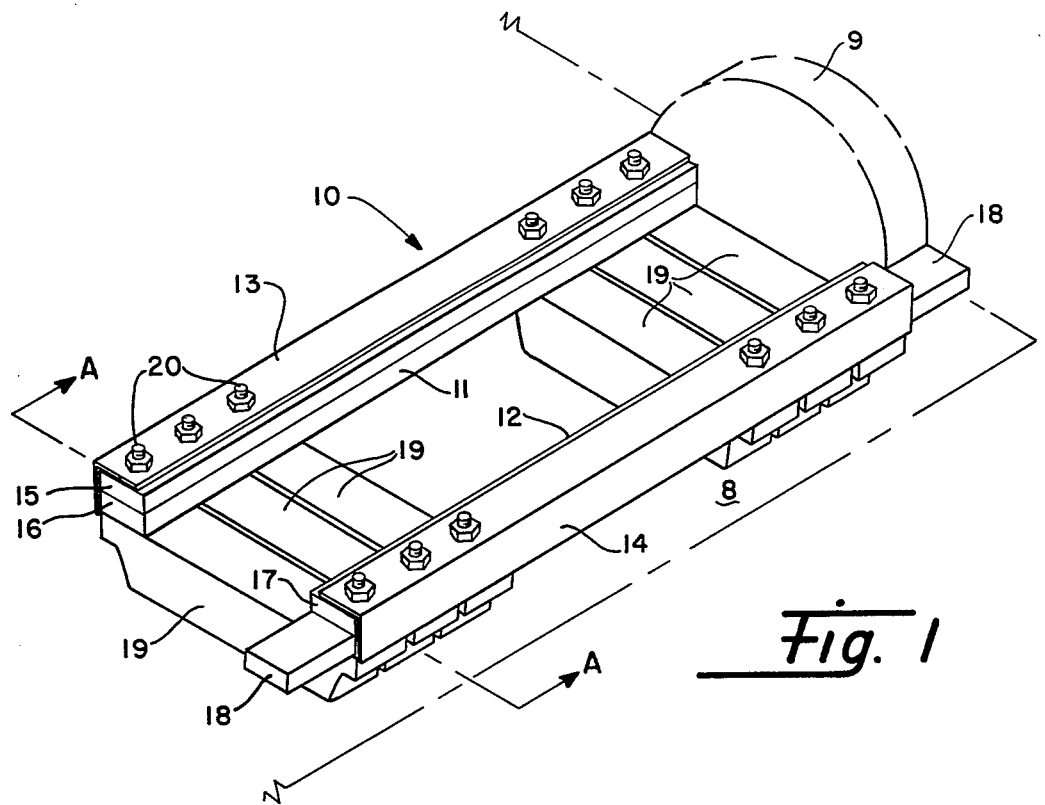
FIG. 1 is an isometric drawing of a representative traction rack of the present invention.

Referring now to FIG. 1, a representative embodiment of the traction rack of the present invention is designated generally by the numeral 10. Rack 10 comprises two assemblies 11, 12, comprising, respectively, rigid angle iron structural members 13 and 14. Angle iron member 13 is sized to attach to and cover wooden spacers 15 and 16, and member 14 covers wooden members 17 and 18. The lengths of structural members 13, 14 and wooden spacers 15, 16, 17 are selected for placement between the wheel wells 9 covering the rear wheels of the pickup truck. Wooden member 18 is sized to include an extension at each end, substantially as shown, extending beyond the spacing between the wheel wells 9 to serve as a stop for convenient positioning of the assembled rack 10 on the bed 8 of the pickup truck between wheel wells 9 and directly over the rear axle of the truck.

Near the ends of the assemblies 11, 12 are bolted one or more lead weights 19 to provide substantial weight concentrated at the extremities of rack 10. Therefore, when rack 10 is placed on the pickup bed 8 between the wheel wells 9, substantial weight is concentrated above the rear axle near each rear wheel thereby providing desirable weight distribution to minimize traction problems. In the assembly shown in FIG. 1, each weight 19 comprises a conventional lead weight in substantially as-produced ingot form, approximately 4 inches square by 20 inches long, weighing approximately 100 pounds. Weights 19 are secured at each end thereof with a bolt 20 extending through the wooden members 15, 16, 17, 18 and the angle iron members 13, 14 secured with mating nuts to form the assembled rack 10 as shown.

Figure 2:
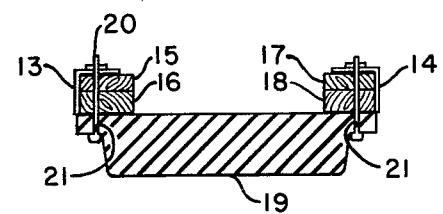
FIG. 2 is a cross-sectional view of the traction rack of FIG. 1 taken along line A—A thereof.

The assembly of rack 10 is best illustrated in the cross-sectional view of FIG. 2 taken substantially along lines A—A of FIG. 1. In order to secure the lead weights 19 to the angle iron-wooden member assemblies 11, 12, holes 21 were drilled in each end of lead ingots 19 to receive bolts 20 for assembling rack 10.

It was found that for a half-ton pickup truck, or truck of like capacity, a rack 10 sized for placement between the wheel wells 9 on the truck bed 8 having about six such weights 19 provided sufficient traction to the truck. It is understood, however, that within the scope of the present invention, the specific number and individual weights of weights 19 shall not be so limited.

The attachment of the weights 19 near each end of rack 10 provided a central spacing between the attached weights of sufficient size such that rack 10 could be easily handled by inserting the tines of a forklift truck under assemblies 11 and 12 between the innermost weights 19. Rack 10 may then be appropriately placed onto bed 8 between wheel wells 9 by inserting the rack 10 until the extensions on wooden member 18 contact the rear surfaces of wheel wells 9 substantially as shown in FIG. 1. Rack 10 thereby provides optimum distribution of weight to the rear wheels of the truck for maximum traction for the weights included in rack 10, without occupying substantial space in bed 8 of the truck.

A rack 10 representative of the invention herein was assembled using 3-inch angle iron members 13, 14 attached to wooden elements 15, 16, 17, 18 comprising conventional 2-inch×4-inch lumber pieces. With the lead weights 19 as described attached, the assembly was approximately 20 inches×42 inches with wooden element 18 having an extension at each end of about 5 inches. Rack 10 was then a compact assembly about 7 inches high. Further, the lead weights 19 used had flanged, slanted ends, as suggested in FIG. 2, which allowed a plurality of racks 10 to be conveniently stacked in nested form for storage when not in use.

The present invention, as herein described in a representative embodiment hereof, therefore provides a novel traction rack for light trucks configured for placement on the truck bed between the wheel wells for increasing traction of the rear wheels. It is understood that certain modifications to the invention as hereinabove described may be made as might occur to one with skill in the applicable field, within the scope of the appended claims.

Therefore, all embodiments contemplated hereunder have not been shown in complete detail. Other embodiments may be developed without departing from the spirit of this invention or from the scope of the appended claims.

I claim:

1. A rack configured for placement on the bed of a truck between the rear wheel wells and over the rear axle thereof, for adding weight in a desired distribution to improve traction of the rear wheels of said truck, comprising:
    a. first and second transverse elements sized for placement on said bed between said wheel wells;
    b. at least one lead weight bolted to respective ends of said transverse elements to form a generally rectangularly-shaped assembly having substantial weight concentrated near the ends of said transverse elements; and
    c. said weights configured to support that portion of said transverse elements between the innermost attached weights in a spaced relationship to said bed.

2. A rack configured for placement on the bed of a truck between the rear wheel wells and over the rear axle thereof, for adding weight in a desired distribution to improve traction of the rear wheels of said truck, comprising:
    a. first and second transverse elements, one of said transverse elements being sized for placement on said bed between said wheel wells, the other said transverse element including an extension on each end thereof exceeding the spacing between said wheel for placement against said wheel wells whereby said assembly may be substantially centered and restrained between said wheel wells over said axle;
    b. at least one lead weight bolted to respective ends of said transverse elements to form a generally rectangularly-shaped assembly having substantial weight concentrated near the ends of said transverse elements; and
    c. said weights configured to support that portion of said transverse elements between the innermost attached weight in a spaced relationship to said bed.

* * * * *